Sept. 30, 1930.         A. C. BAIMBRIDGE ET AL         1,776,989
COLLAPSIBLE ROTARY SPEAR
Filed June 13, 1928
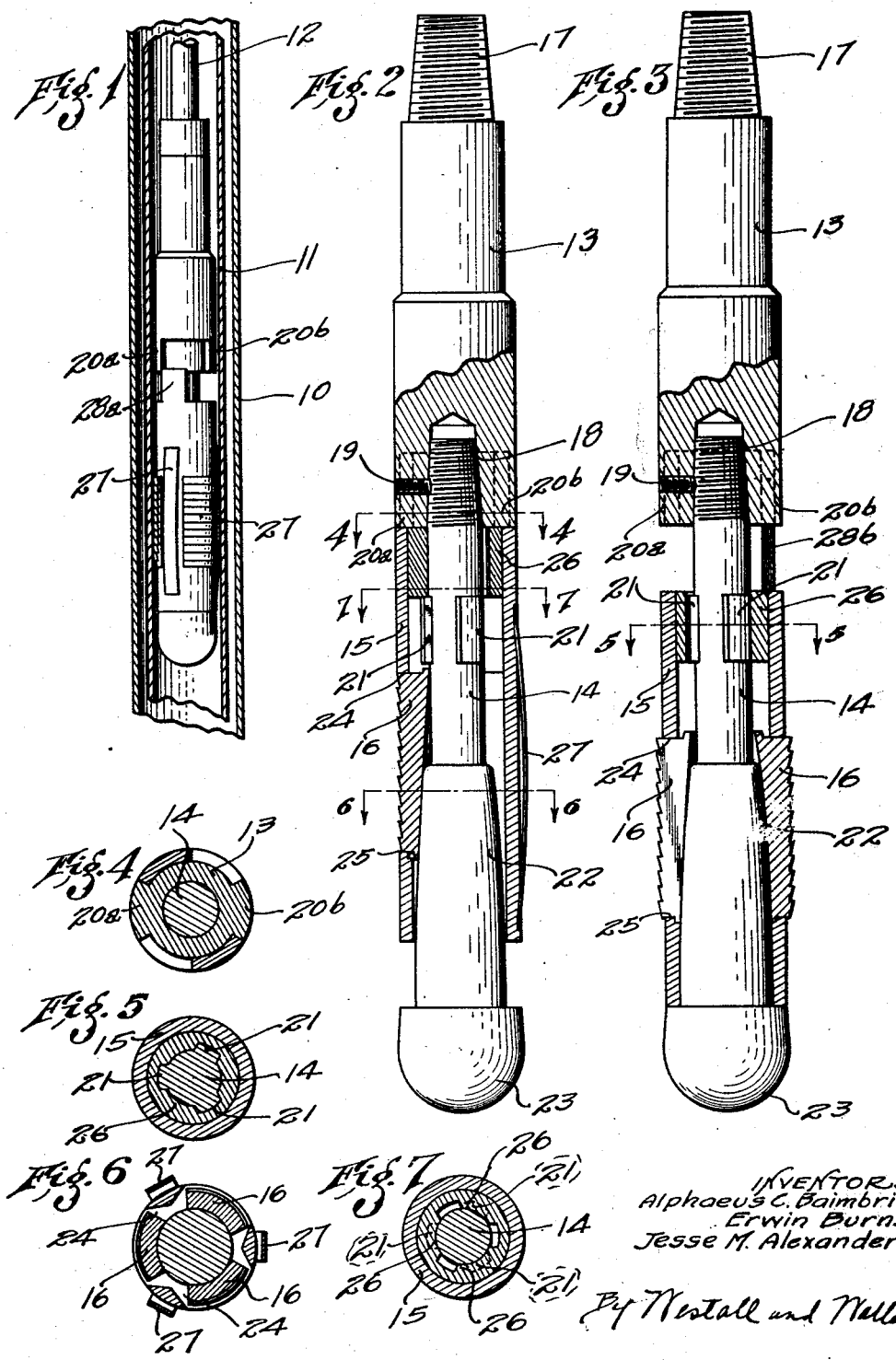
INVENTORS
Alphaeus C. Baimbridge
Erwin Burns
Jesse M. Alexander
ATTORNEYS Patented Sept. 30, 1930

1,776,989

UNITED STATES PATENT OFFICE

ALPHAEUS C. BAIMBRIDGE AND ERWIN BURNS, OF LOS ANGELES, AND JESSE M. ALEXANDER, OF SOUTHGATE, CALIFORNIA

COLLAPSIBLE ROTARY SPEAR

Application filed June 13, 1928. Serial No. 284,946.

This invention relates to a spear which is suitable for fishing out of well holes tubular members, such as pipe, casing and the like, and appertains more particularly to a collapsible spear. As is well known in the art of well drilling, it is advantageous at times to change the hole of a spear and in some instances to withdraw the spear from the hole. Heretofore, trip spears have been used to meet this desired feature of operation. Such spears are released by driving upon them with tools.

The present invention has for its primary object the provision of a collapsible spear operable by rotation of the fishing tool string to place the slips in expanded or collapsed condition. In addition to the broader objects of this invention, further objects are to provide a collapsible spear having any or all of the following features: means to lock the slip in work non-engaging position; means to yieldably grip the work to provide for relative turning and longitudinal shifting of the parts to position them in work engaging or work non-engaging position; and means to permit only a limited rotational movement of parts whereby the locking means is alined to present the parts either in work engaging position or work non-engaging position.

These objects together with other objects and corresponding accomplishments are obtained by means of the embodiment of our invention illustrated in the accompanying drawings, in which:—

Fig. 1 is a longitudinal section through a fragment of a well casing and tubing and our improved spear shown in elevation within the tubing in position taking hold of the tubing; Fig. 2 is an elevation partly in section on an enlarged scale showing the spear locked in work non-engaging position; Fig. 3 is a view similar to Fig. 2 showing the parts in work engaging position; and Figs. 4 to 7 are sections as seen on the lines correspondingly numbered in Figs. 2 and 3.

Referring more particularly to Fig. 1, a well casing is indicated by 10. Disposed therein is tubing 11 which is to be elevated and upon which the spear has taken a hold. Within the tubing is the spear which is attached to a fishing tool string 12 and whereby the spear is manipulated.

The spear comprises a head 13 to which a mandrel 14 is secured. Mounted over the mandrel is a rotatable and longitudinally shiftable cage or shell 15 carrying slips 16. Referring more in detail to the drawing, the head 13 includes a tapered threaded pin 17 adapting it for connection to the fishing tool string, and at the lower end a threaded bore 18 is provided to receive the threaded end of mandrel 14. A set screw 19 serves to lock the mandrel in attached position. The head is recessed on diametrically opposite sides at the periphery to provide coupling jaws $20^a$ and $20^b$. The mandrel 14 is provided with abutment jaws 21 projecting from the cylindrical portion thereof, the lower portion of the mandrel being enlarged and provided with a tapering surface as indicated by 22. At the end of the cage is a head 23.

The shell or cage 15 is tubular in form and has longitudinal slots 24 to accommodate slips 16. The slips are provided with inclined inner faces to coact with the tapering portion of the mandrel. Wings or extensions 25 are provided on the slips to engage the inner wall of the cage and prevent displacement and loss of the slips. The slips are loosely mounted in position so that they can be projected and retracted. Extending inwardly from the wall of the cage at the upper end are abutment jaws 26 to co-operate with jaws 21. Mounted upon the cage are bowed springs 27 preferably attached at one end to the cage and free at the other. These springs serve to yieldingly engage the tubing and frictionally resist rotation of the cage.

The spear is set in work non-engaging position by raising the cage on the mandrel to the position shown in Fig. 2. The mandrel is then turned in relation to the cage so that coupling jaws $28^a$ and $28^b$ thereon engage lateral surfaces of coupling jaws $20^b$ and $20^a$ respectively with the abutment jaws 21 and 26 in alinement, the end faces bearing upon one another. In this position the tapering surface 22 is retracted with respect to slips 16, and the latter may be collapsed. The spear is then lowered in the tubing by means of the fishing tool string, until it has reached the position at which it is desired to take hold of the tubing. At this position, the string is rotated so as to turn the head 13, a limited rotational movement being permitted by the rotational coupling bringing coupling jaws 20$^a$ and 20$^b$ respectively into engagement with coupling jaws 28$^a$ and 28$^b$. In this position the abutment jaws 21 and 26 are in non-alinement position, and they may be passed by one another. By elevating the fishing tool string the tapered surface 22 is brought to bear upon the slips and projects the latter to expanded position as shown in Fig. 3. During the manipulation of the tool, the springs 27 serve to hold the cage against rotation. To collapse the tool, the string is lowered and turned in the reverse direction. It is obvious that manipulation of the tool to collapsing and non-collapsing position or vice versa may be performed in the well hole.

What we claim is:—

1. A spear comprising a cage, an expander mandrel slidably mounted in said cage and extending axially thereof, slips projectable from said cage and operable by longitudinal movement of said mandrel in relation thereto to cause expansion and collapsion of said slips, coacting abutment jaws on said mandrel and cage shiftable into position out of lateral apposition and turnable in relation to one another into longitudinal alinement to engage and sustain said cage and mandrel in collapsing position or turnable into unalinement to permit longitudinal relative shifting of said mandrel and cage to work engaging position with said jaws in apposition, and rotational coupling means connecting said cage and mandrel permitting and limiting relative rotation of the abutment jaws between jaw alinement and non-alinement positions.

2. A spear comprising a shell with slots in the peripheral wall thereof, slips accommodated in said slots for projection and retraction, spaced inwardly projecting abutment jaws on said shell, a mandrel rotatably and longitudinally shiftable in said shell, said mandrel having a tapering surface bearing against said slips, abutment jaws on said mandrel corresponding to the abutment jaws on said shell to provide coacting abutment surfaces turnable in relation to one another into longitudinal alinement to engage and sustain said shell and mandrel in collapsing position or into unalinement to permit longitudinal movement for location of said mandrel and shell in work engaging position, a head on said mandrel with longitudinally extending coupling jaws, cooperating coupling jaws extending from said shell and meshing with the coupling jaws on said head, the coacting coupling jaws being spaced to provide for limited rotational movement of said cage and mandrel, said coupling jaws being so positioned with respect to said abutment jaws so that in lateral bearing position of opposing surfaces of said coupling jaws, said abutment jaws will be in longitudinal alinement and in the bearing position of the opposite surfaces of said coupling jaws said abutment jaws will be out of alinement.

3. A spear comprising a shell with slots in the peripheral wall thereof, slips accommodated in said slots for projection and retraction, spaced inwardly projecting abutment jaws on said shell, a mandrel rotatably and longitudinally shiftable in said shell, said mandrel having a tapering surface bearing against said slips, cooperating abutment jaws on said mandrel corresponding to the jaws on said shell to provide coacting abutment surfaces turnable in relation to one another into longitudinal alinement to engage and sustain said shell and mandrel in collapsing position or into unalinement to permit longitudinal movement for location of said mandrel and shell in work engaging position, a head on said mandrel with longitudinally extending coupling jaws, coupling jaws extending from said shell and meshing with the coupling jaws on said head, the coacting coupling jaws being spaced to provide for limited rotation of movement of said cage and mandrel said coupling jaws being so positioned with respect to said abutment jaws that in lateral bearing position of opposing surfaces of said coupling jaws, said abutment jaws will be in longitudinal alinement and in the bearing position of the opposite surfaces of said coupling jaws, said abutment jaws will be out of alinement, and means on said shell to frictionally engage the work and resist rotation.

In witness that we claim the foregoing we have hereunto subscribed our names this 23rd day of May, 1928.

ALPHAEUS C. BAIMBRIDGE.
ERWIN BURNS.
JESSE M. ALEXANDER.